United States Patent Office 3,547,905
Patented Dec. 15, 1970

3,547,905
ADAMANTOYLCYTOSINE ARABINOSIDE AND PROCESS FOR PREPARING SAME
Paul F. Wiley, Kalamazoo, Mich., assignor to The Upjohn Company, Kalamazoo, Mich., a corporation of Delaware
No Drawing. Filed July 16, 1968, Ser. No. 745,096
Int. Cl. C07d 51/52
U.S. Cl. 260—211.5
4 Claims

ABSTRACT OF THE DISCLOSURE

The new compound. 1-β-D-arabinofuranosylcytosine 5'-(1-adamantanecarboxylate), termed herein for brevity, 5'-O-adamantoylcytosine arabinoside or AdOCa is prepared by adamantoylation of 1-β-D-arabinofuranosylcytosine termed herein for brevity, cytosine arabinoside or Ca. It is useful as an agent for controlling the growth of tumors, particularly in extending the usefulness of cytosine arbinoside, a known anti-tumor agent.

The invention described herein was made in the course of, or under, a contract with the Department of Health, Education, and Welfare.

BACKGROUND OF THE INVENTION

Cytosine arabinoside has been known for some time as an effective agent for controlling growth of certain kinds of tumors. Its use has been hampered, however, because of difficulties in establishing and maintaining effective and sustained contact between the compound and the cells under treatment.

BRIEF DESCRIPTION OF THE INVENTION

We have discovered that 5'-O-adamantoylcytosine arabinoside is significantly more effective than the unesterified cytosine arabinoside because of the modified absorption properties which render this novel compound suitable for treatments in which sustained release of drug, that is a "depot" effect, is desirable.

The compound is synthesized by direct acylation of cytosine arabinoside to yield first the bis-acyl compound, 1β-D-arabinofuranosylcytosine 5' - O,N - bis(1-adamantanecarboxylate). The product is then selectively hydrolyzed to produce the novel compound (AdOCa) of this invention.

The partial hydrolysis can be accomplished by known methods, e.g., by using a methanolic solution of an aqueous base such as potassium hydroxide or sodium hydroxide.

The esterification can be carried out using 1-adamantanecarboxylic acid chloride or other halide and cytosine arabinoside in a reaction medium containing pyridine or other organic base.

A new compound of this invention, i.e., the bis-acyl compound previously mentioned is useful as an intermediate in the preparation of 5'-O-adamantoylcytosine arabinoside. The latter is useful as previously mentioned in its free base form; it is also useful in the form of its salts with pharmaceutically acceptable acids, such as the hydrochloride, the sulfate, the phosphate, the acetate, and the like. The salts can be prepared simply by conducting a reaction between the free base compound and the desired acid in a suitable solvent system.

DETAILED DESCRIPTION OF THE INVENTION

Example.—Preparation of 5'-O-adamantoylcytosine arabinoside (AdOCa)

A solution of 18 g. (0.10 mole) of 1-adamantanecarboxylic acid in 200 ml. of thionyl chloride was refluxed for one-half hour. The volatile material was removed by evaporation in vacuo. The residue was dissolved in 50 ml. of dry benzene and again evaporated to dryness in vacuo. This process was repeated. The residue, 1-adamantanecarboxylic acid chloride, and 9.7 g. (0.04 mole) of cytosine arabinoside were dissolved in 2.25 l. of dry pyridine, and the solution was refluxed for five hours. The pyridine was removed by distillation under reduced pressure at 30°. The residue was partitioned between 300 ml. of water and 300 ml. of chloroform. The chloroform layer was removed, and the aqueous layer was extracted with two 300-ml. portions of chloroform. The combined chloroform extracts were washed successively with 200 ml. of water, 200 ml. of saturated sodium bicarbonate solution, and two 200-ml. portions of water followed by drying over magnesium sulfate. Filtration and evaporation in vacuo gave 29.4 g. of residue. The residue was chromatographed over 1.5 kg. of silica gel which had been packed in chloroform-methanol (96:4), and eluted with the same solvent, collecting 20-ml. fractions. Fractions 436–630 were combined on the basis of a weight analysis and evaporated to dryness in vacuo. The residue weighed 13.8 g.

An analytical sample of the product, 1-β-D-arabinofuranosylcytosine 5'-O,N-bis(1-adamantanecarboxylate), had the following characteristics:

Analysis.—Calc'd for $C_{31}H_{41}N_3O_7$ (percent): C, 65.80; H, 7.28; N, 7.40. Found (percent): C, 64.62; H, 7.37; N, 7.05.

Melting point on the above sample was 178–193°.
UV($CH_3OH$):

| $\lambda_{max}$: | $\epsilon$ |
|---|---|
| 214 | 15,900 |
| 249 | 15,300 |
| 300 | 8,730 |

IR: 3410, 3360, 1710, 1650, 1615, 1555, 1310, 1270, 1230, 1130, 1065 cm.$^{-1}$.

A solution of 1 g. of the above product, 1-β-D-arabinofuranosylcytosine 5'-O,N-bis(1-adamantanecarboxylate), was dissolved in 150 ml. of methanol, and 50 ml. of 0.1 N sodium hydroxide was added. The solution was allowed to stand at room temperature for 45 minutes followed by adjustment to pH 7.9 using 1.0 N hydrochloric acid. The solution was evaporated in vacuo until a considerable amount of precipitate had formed. The mixture was refrigerated and filtered. There was obtained 0.56 g. of solid which was recrystallized by solution in 100 ml. of boiling methanol and concentration until considerable crystalline material had appeared. The mixture was refrigerated and filtered to give 272 mg., M.P. 290–291°.

A sample of the product, 5'-O-adamantoylcytosine arabinoside, was further purified by recrystallization from dimethylformamide and methanol, M.P. 300–301°.

Analysis.—Calc'd for $C_{20}H_{27}N_3O_6$ (percent): C, 59.25; H, 6.71; N, 10.37. Found (percent): C, 59.34; H, 7.19; N, 10.16.

UV($CH_3OH$):

| $\lambda_{max}$: | $\epsilon$ |
|---|---|
| 232 sh. | 7790 |
| 272 | 9400 |

IR: 3350, 3230, 3150, 1690, 1655. 1630, 1005, 1525, 1295, 1240, 1105, 1080, 1055, 1015, 990, 960, 928, 875 and 808.

NMR: Multiple peaks at $\delta 1.55$–$\delta 2.0$ (15H), multiplet at $\delta 3.8$–$\delta 4.3$ (5H) due to $C_2'$, $C_3'$, $C_4'$ and $C_5'$ H, broad peak centered at $\delta 5.53$ (2H) due to H on oxygen, doublet at $\delta 5.68$ (1H), doublet at $\delta 5.68$ (1H), doublet at $\delta 6.12$ (1H, anomeric H), broad peak at $\delta 7.08$ (2H) due to —$NH_2$, doublet at $\delta 7.47$ (1H).

The anti-tumor activity of 5'-O-adamantoylcytosine arabinoside (AdOCa) was demonstrated by an in vivo test using L1210 lymphoid leukemia in mice. The method closely follows the protocol established by the Cancer Chemotherapy National Service Center (CCNSC) and described in Cancer Chemotherapy Reports, No. 25, pages 1–67, 1962. Ascitic fluid (containing a known number of leukemia L1210 cells) from donor mice is implanted intraperitoneally in test mice. These mice are of the same strain ($BDF_1$), sex, source and weight (19±2 gm.). They are randomly sorted into groups of 8–10 animals, including one control group. Therapy is initiated 24 hours subsequent to tumor implantation and continued according to the treatment schedule employed. Candidate anti-tumor agents are dissolved or suspended in a sterile vehicle (saline or 0.25% aqueous methyl cellulose). AdOCa is largely water-insoluble and thus was administered as a suspension. Agents are administered either intraperitoneally (i.p.) or orally (p.o.) in a uniform volume of 0.2 ml. Control animals received only the appropriate vehicle. Mice were observed, and deaths were recorded, twice daily. In order to determine effectiveness of treatment, median survival times and percent increases in life span (percent ILS) as compared to control animals were calculated according to the CCNSC protocol. A thorough study has suggested percent ILS=25 as a minimum criterion for anti-tumor activity. A percent ILS=25 means that the median animal of the treated group lived 25% longer than the median animal of the untreated (control) group. The results are as follows:

The pronounced anti-tumor activity of 5'-adamantoylcytosine arabinoside is shown by the increased survival time in the treated animals. The sustained release property is shown by percent ILS=160 for AdOCa upon single dose administration on day 1, whereas cytosine arabinoside itself upon such administration gave percent ILS=6.

The hydrochloride salt of 5'-O-adamantoylcytosine arabinoside is prepared by reacting 5'-O-adamantoylcytosine arabinoside in aqueous suspension with hydrochloric acid to produce a solution, and then removing the water, as by evaporation. It can be used in place of the free base in the test described in the foregoing paragraphs.

I claim:

1. A member of the group consisting of 1-β-D-arabinofuranosylcytosine 5' - O,N-bis(1-adamantanecarboxylate) and 1-β-D-arabinofuranosylcytosine 5' - (1 - adamantanecarboxylate) and the acid addition salts of the latter.

2. 1-β-D-arabinofuranosylcytosine 5' - (1-adamantanecarboxylate) in accordance with claim 1.

3. 1-β-D - arabinofuranosylcytosine 5' - O,N - bis(1-adamantanecarboxylate) in accordance with claim 1.

4. The method comprising reacting 1-adamantanecarboxylic acid halide with 1-β-D-arabinofuranosylcytosine in the presence of an organic base to form 1-β-D-arabinofuranosylcytosine 5' - O,N-bis(1-adamantanecarboxylate) and hydrolyzing the latter to produce 1-β-D-arabinofuranosylcytosine 5'-(1-adamantanecarboxylate).

| | Agent | Route [3] | Treatment [1] Dose, mg./kg. | Total dose, mg./kg. | Schedule | Survival time [2] Median (days) | Range (days) | Percent [4] ILS |
|---|---|---|---|---|---|---|---|---|
| Test: | | | | | | | | |
| 1 | Control AdOCa [5] | i.p. | — | — | Daily doses; days 1–7 | 7.5 | 7.0–8.0 | — |
| | | | 5.2 | 36 | | 8.5 | 7.5–9.5 | 13 |
| | | | 10.4 | 73 | | 9.5 | 9.5–10.5 | 27 |
| | | | 20.7 | 145 | | 10.5 | 9.5–11.0 | 40 |
| | | | 41.3 | 290 | | 15.0 | 13.5–18.0 | 100 |
| 2 | Control, AdOCa | p.o. | — | — | Daily doses; days 1–7 | 7.5 | 7.0–8.0 | — |
| | | | 60 | 420 | | 10.5 | 7.5–14.5 | 40 |
| | | | 80 | 560 | | 15.5 | 12.0–17.5 | 106 |
| | | | 120 | 840 | | 13.5 | 10.0–17.0 | 80 |
| 3 | Control | i.p. | — | — | Single dose; day 1 | 7.5 | 7.5–8.0 | — |
| | do | | — | — | Single doses; days 1, 4, 7 | 7.5 | 6.5–9.5 | — |
| | Ca·HCl [5] | | 300 | 300 | Single dose; day 1 | 8.0 | 7.5–8.5 | 6 |
| | do | | 100 | 300 | Single doses; days 1, 4, 7 | 10.0 | 9.5–11.5 | 33 |
| | AdOCa | | 300 | 300 | Single dose; day 1 | 19.5 | 10.5–23.5 | 160 |
| | do | | 100 | 300 | Single doses; days 1, 4, 7 | 23.0 | 18.5–34.0 | 206 |

[1] Treatment initiated 24 hrs. after i.p. implantation of $10^5$ L1210 cells.
[2] Survival times measured from day of tumor implantation (day zero).
[3] Agent administration: i.p.=intraperitoneal; p.o.=oral.
[4] Percent ILS=25 considered significant inhibition of tumor growth.
[5] AdOCa=Adamantoylcytosine arabinoside. Ca·HCl=Cytosine arabinoside hydrochloride.

References Cited

UNITED STATES PATENTS 3,407,191  10/1968  Gerzon et al.  _____ 260—211.5

LEWIS GOTTS, Primary Examiner

J. R. BROWN, Assistant Examiner

U.S. Cl. X.R.

424—180

UNITED STATES PATENT OFFICE
CERTIFICATE OF CORRECTION

Patent No. 3,547,905            Dated December 15, 1970

Inventor(s) Paul F. Wiley

It is certified that error appears in the above-identified patent and that said Letters Patent are hereby corrected as shown below:

Column 1, lines 44 and 45, column 2, lines 24, 25, 39 and 40, column 4, lines 16, 17, 22, 23, 26 and 27, "1-$\beta$-D-arabinofuranosylcytosine 5'-O,N-bis(1-adamantanecarboxylate)", all occurrences, should read -- N-(1-adamantylcarbonyl)-1-[5-O-(1-adamantylcarbonyl)-$\beta$-D-arabinofuranosyl]cytosine -- .

Signed and sealed this 12th day of December 1972.

(SEAL)
Attest:

EDWARD M. FLETCHER, JR.            ROBERT GOTTSCHALK
Attesting Officer                     Commissioner of Patents